(12) United States Patent
Thackara

(10) Patent No.: US 6,546,163 B2
(45) Date of Patent: Apr. 8, 2003

(54) PLANAR WAVEGUIDE SWITCH AND OPTICAL CROSS-CONNECT

(76) Inventor: John I. Thackara, 655 S. Fairoaks Ave., D-317, Sunnyvale, CA (US) 94086

( * ) Notice: Subject to any disclaimer, the term of this patent is extended or adjusted under 35 U.S.C. 154(b) by 72 days.

(21) Appl. No.: 09/866,039

(22) Filed: May 24, 2001

(65) Prior Publication Data

US 2002/0041726 A1 Apr. 11, 2002

Related U.S. Application Data

(60) Provisional application No. 60/238,961, filed on Oct. 9, 2000.

(51) Int. Cl.[7] .................................................. G02B 6/26
(52) U.S. Cl. ............................ 385/18; 385/47; 385/20; 385/131
(58) Field of Search .............................. 385/47, 18, 20, 385/131

(56) References Cited

U.S. PATENT DOCUMENTS 5,040,864 A * 8/1991 Hong ........................... 359/15
5,544,268 A * 8/1996 Bischel et al. ................. 385/16
6,253,015 B1 * 6/2001 Ukrainczyk .................. 385/129
6,456,419 B1 * 9/2002 Winker et al. ......... 250/227.17

* cited by examiner

Primary Examiner—Hung N. Ngo
(74) Attorney, Agent, or Firm—Oppenheimer Wolff & Donnelly LLP; Claude A. S. Hamrick

(57) ABSTRACT

A planar waveguide integrated optic switch suitable for use in optical cross-connect applications. A narrow trench in the planar waveguide core layer is filled with a liquid crystal material possessing positive birefringence. When held at a temperature a few degrees above the clearing point, the liquids crystal's isotropic refractive index is matched to that of the core layer allowing nearly complete optical transmission through the switch. When held at a temperature a few degrees below the clearing point, the liquid crystal's ordinary refractive index is lower than that of the core layer and both polarizations of the incident optical radiation are totally reflected from the trench. When coupled with planar waveguide beam expanding and refocusing elements, arrays of the switches can be used to form an optical cross-connect capable of fully interconnecting linear arrays of single- or multi-mode optical fibers with very low optical loss. By controlling the liquid crystal temperature at more than one location along the trench, the switch can be configured to operate as a variable attenuator.

34 Claims, 9 Drawing Sheets

PLANAR WAVEGUIDE SWITCH AND OPTICAL CROSS-CONNECT

CROSS REFERENCE TO RELATED APPLICATIONS

Reference is made to and priority claimed from U.S. provisional application Serial No. 60/238,961, filed Oct. 9, 2000, entitled "Planar Waveguide Switch and Optical Cross-Connect".

BACKGROUND OF THE INVENTION

1. Field of the Invention

The present invention relates generally to optical switches of the integrated optic type, and more particularly to a liquid crystal based integrated optic switch capable of redirecting optical beams of arbitrary polarization state in a planar waveguide geometry. Additionally, the invention relates to an optical cross-connect architecture made up of an array of the liquid crystal based integrated optic switches capable of interconnecting a large number of single- or multi-mode optical fiber channels.

2. Description of the Prior Art

Currently, the vast majority of optical cross-connect geometries employ either free-space propagation (see U.S. Pat. Nos. 5,960,132, 6,040,935, 6,097,518 and 6,097,859) or a network of channel waveguides (M. Kondo et al., "Integrated Optical Switch Matrix for Single-Mode Fiber Networks", IEEE Trans. Microwave Theory Tech., Vol. MTT-30, pp. 1747–1753 (1982); M. Okuno et al., "8×8 Optical Matrix Switch using Silica-Based Planar Lightwave Circuits", IEICE Trans. Electron., Vol. E76-C(7), pp. 1215–1223 (1993); U.S. Pat. Nos. 4,988,157, 5,699,462 and 5,978,527) to route the optical beams to, between, and from an array of optical switch elements. To operate effectively, these architectures require either extremely precise two-dimensional alignment of the free-space switch elements with the optical beams, as well as with the input and output optical channels, or a complex network of optical channel waveguides which must be fabricated to very precise tolerances. Other architectures, such as some based on mirror-type switches (U.S. Pat. No. 4,828,362) or on optical gratings (U.S. Pat. No. 5,255,332), can either be sensitive to the polarization state of the optical radiation being switched or require the use of optical amplifiers to offset losses within the cross-connect. Due to these exacting fabrication and/or system requirements, current optical cross-connect architectures can be difficult to implement.

SUMMARY OF THE INVENTION

It is therefore an object of this invention to provide an integrated optic switch that is capable of efficiently redirecting optical beams of arbitrary polarization state in a simple planar waveguide geometry.

It is also the object of this invention to provide an optical cross-connect architecture based on these planar waveguide integrated optic switches which is capable of dynamically interconnecting a large number of single- or multi-mode optical fiber input and output channels with very low optical loss and doing so with stable fiber-to-cross-connect opto-mechanical bonds but without the use of any optical channel waveguides within the optical cross-connect.

According to the preferred embodiment of the present invention, an integrated optic switch is formed within a planar waveguide structure such as that disclosed in H. Kogelnik, "An Introduction to Integrated Optics", IEEE Trans. Microwave Theory Tech., vol. MTT-23, pp. 2–16 (1975) by filling a narrow trench in the planar waveguide core layer with a liquid crystal material, P. G. de Gennes and J. Prost, *The Physics of Liquid Crystals*, Clarendon Press-Oxford, pp. 1–18 (1993). The trench extends through nearly the full thickness of the core layer and is covered by the planar waveguide's upper cladding layer. The planar waveguide is made to support at least one optical mode in the direction normal to the waveguide but contains no structure(s) to confine the optical radiation in the lateral direction.

Lateral collimation of a beam of optical radiation is maintained within the planar waveguide by making the lateral beam width much larger than the optical wavelength of the radiation. Within the switch, the collimated beam is made to impinge on the trench at a high angle of incidence, and the length of the trench is made long enough to extend beyond the beam on both sides. The liquid crystal and planar waveguide core materials are chosen so that their refractive indices are equal when the liquid crystal material is in its isotropic phase. Additionally, the liquid crystal material is chosen to have positive birefringence so that its isotropic refractive index is greater than its ordinary refractive index when the material is in its nematic phase. For the switch to operate in the cross or ON state, the liquid crystal material is maintained at a temperature a few degrees below the clearing point so that the liquid crystal is in its nematic phase.

When in the nematic phase, the liquid crystal director is aligned along the axis of the trench. For this orientation of the liquid crystal director, both polarizations of the incident optical radiation experience a liquid crystal index essentially equal to the ordinary refractive index which is lower than the refractive index of the planar waveguide core material. The incident angle of the collimated beam is made to be above the critical angle for this combination of planar waveguide core and liquid crystal indices so that all of the incident optical radiation will be reflected from the planar waveguide core/nematic liquid crystal interface.

To drive the switch into the through or OFF state, the temperature of the liquid crystal is raised to a temperature a few degrees above the clearing point so that the liquid crystal is in the isotropic phase. In the isotropic phase, the refractive index of the liquid crystal material matches the refractive index of the planar waveguide core so that there is no reflection from the planar waveguide core/isotropic liquid crystal interfaces, and all of the incident optical radiation is transmitted through the liquid crystal filled trench. The switch can therefore be operated in either the ON or OFF state simply by holding the liquid crystal material at a temperature a few degrees below or a few degrees above the clearing temperature.

Also according to this invention, an optical cross-connect is formed within a planar waveguide structure by fabricating a two-dimensional array (N×N or N×M) of the planar waveguide integrated optic switches along with input and output linear arrays of integrated optic beam collimators. The arrays of beam collimators are aligned with respect to the switch array so that a linear array of point-source optical inputs is transformed into N collimated beam inputs to the switch array and so that the N (or M) collimated beam outputs from the switch array are refocused to a linear array of point-source optical outputs. One edge of the planar waveguide structure is made to coincide with the linear array of optical inputs and a second edge is made to coincide with the linear array of optical outputs. Single- or multi-mode optical fibers can then serve as the optical inputs and outputs to the cross-connect by opto-mechanically bonding them to the input and output edges of the planar waveguide structure. Each fiber is bonded at a location such that its core is both aligned with the planar waveguide core layer and with the location of the focal point of the corresponding beam collimator.

The thickness of the planar waveguide core layer and the refractive index of the upper and lower cladding layers are chosen to maximize the optical coupling between the optical fibers and the planar waveguide. Within the planar waveguide, the optical radiation from each input is confined in the direction normal to the core layer but is allowed to spread out in the lateral direction until it reaches the corresponding collimator where it is transformed into a collimated beam. After traversing the switch array, the still collimated output beams are refocused onto the array of output fibers by the output collimator array. The cross-connect is operated by holding one switch in each row in the ON state to direct that beam into the desired output beam path. During operation, therefore, a total of N switches in the array are held in the ON state and all other switches are held in the OFF state.

IN THE DRAWINGS

Figure 8:
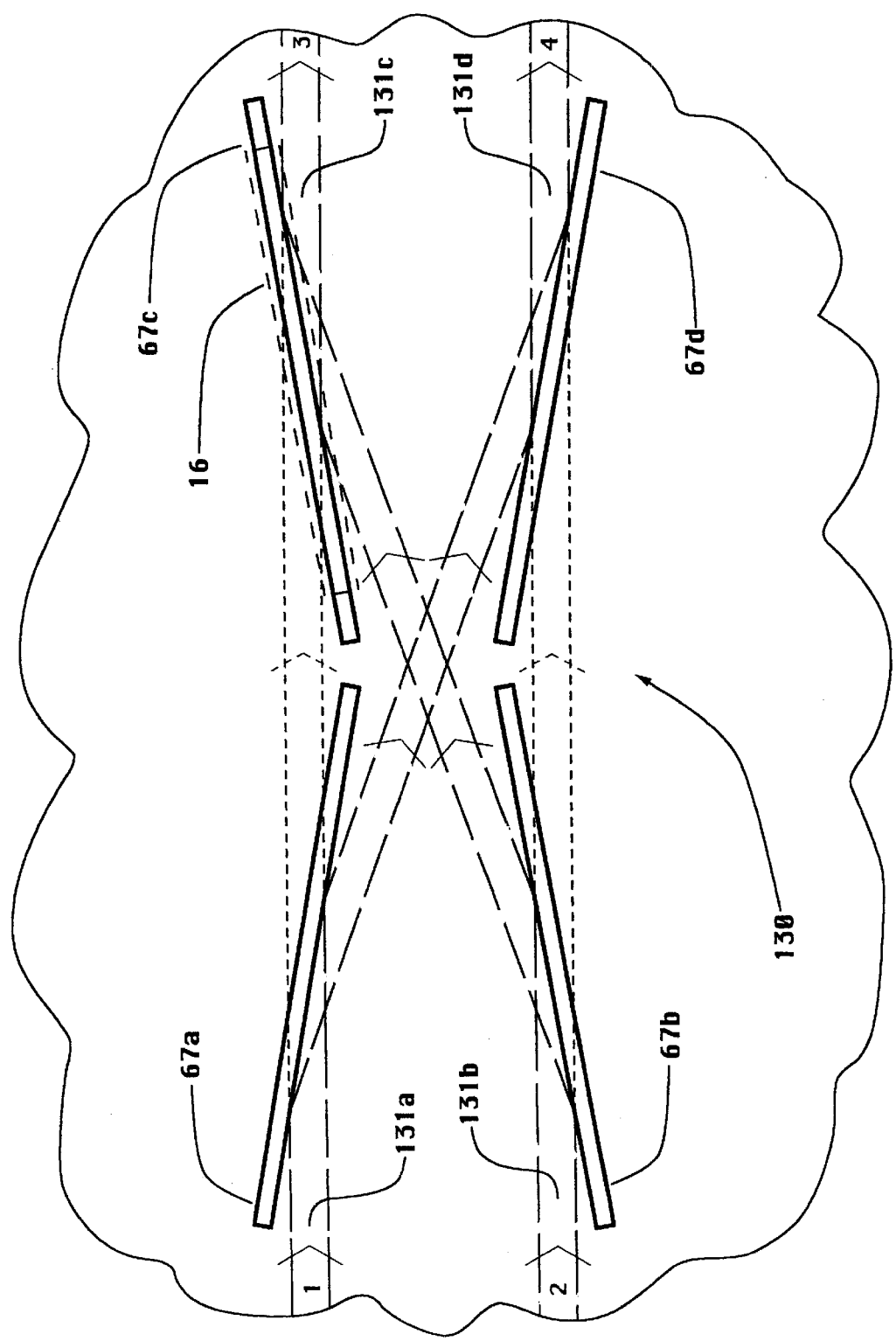

FIG. 8 is a top view of an alternate cross-connect architecture in which four of the planar waveguide integrated optical switches are configured to operate as a 2×2 cross-connect building block showing the four switch elements, the paths of the two collimated beams when the 2×2 is operated in the cross state, as well as the paths that the two beams would take when the 2×2 was operated in the bar state.

Figure 9:
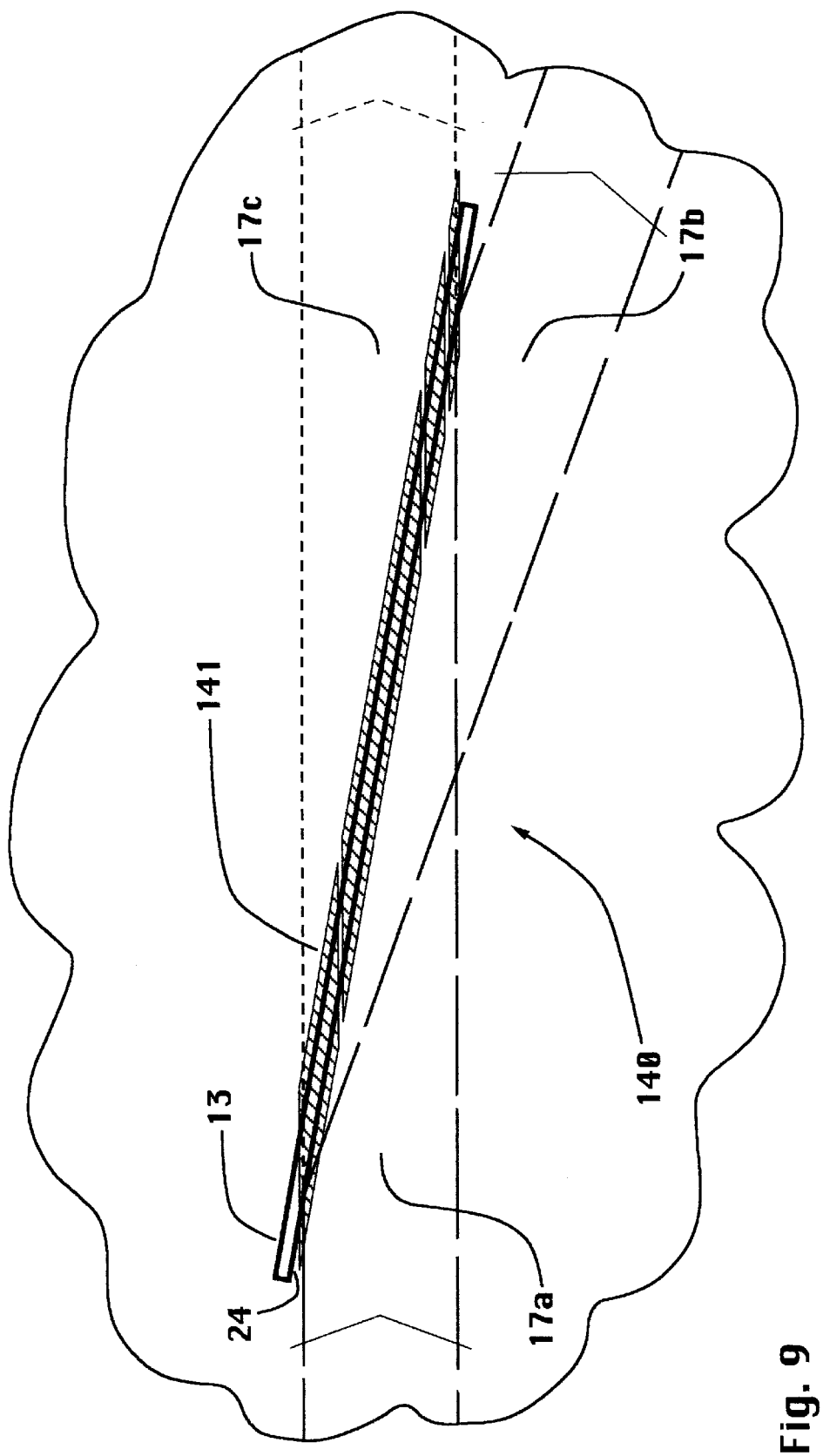

FIG. 9 is a top view of an alternate embodiment of the planar waveguide integrated optical switch in which the switch is configured to operate as a variable attenuator showing the liquid crystal filled trench, a plurality of temperature control elements, the collimated input beam, the attenuated beam, and the compliment attenuated beam.

DETAILED DESCRIPTION OF THE PREFERRED EMBODIMENTS

Figure 1:
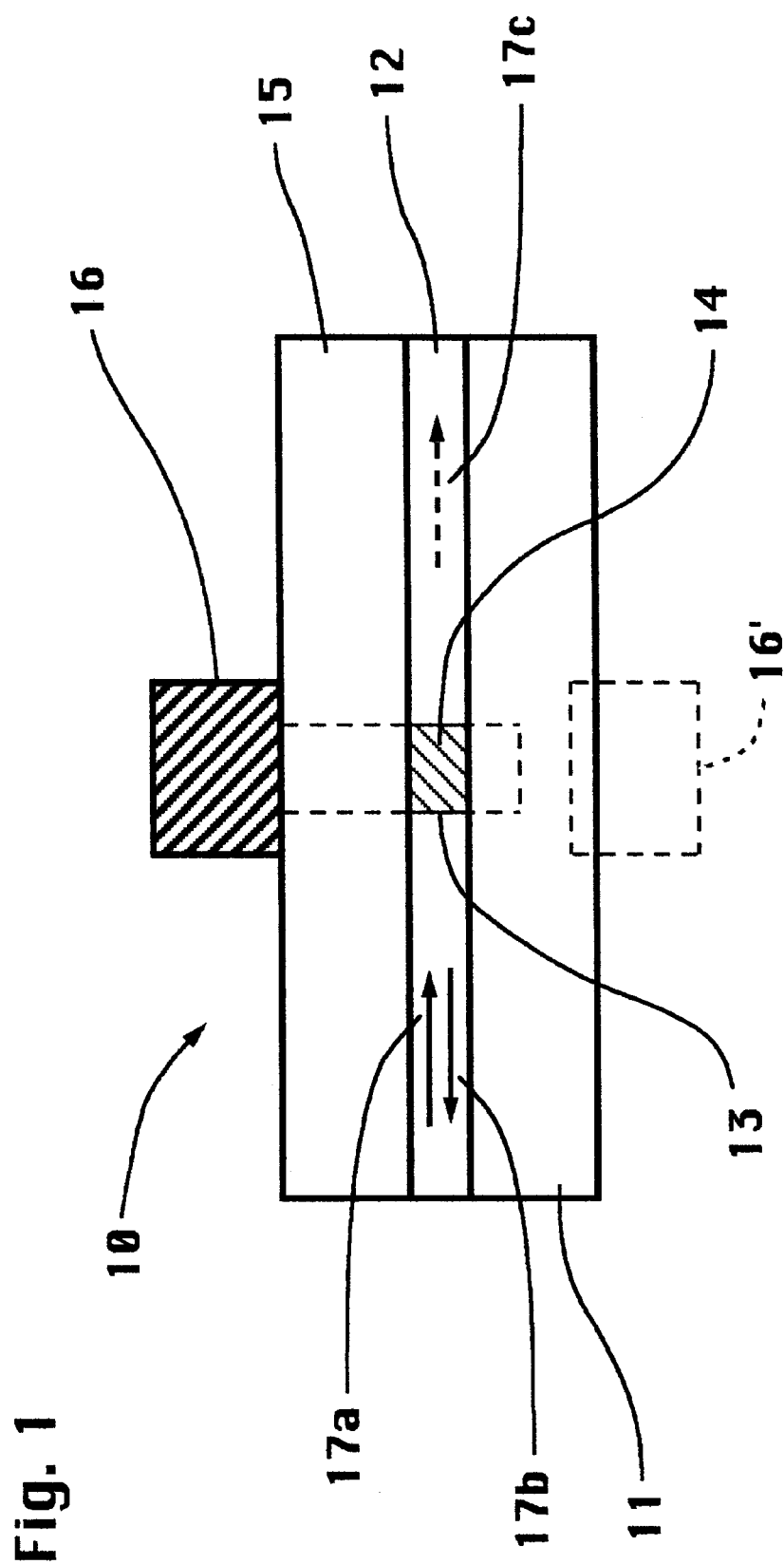
FIG. 1 is a cross-sectional view illustrating a planar waveguide integrated optic switch in accordance with the present invention taken along the line 1—1 of FIG. 2 and showing the planar waveguide core layer, the liquid crystal filled trench, the substrate and superstrate, the temperature control element, and the propagation directions of the input and output beams.
Figure 2:
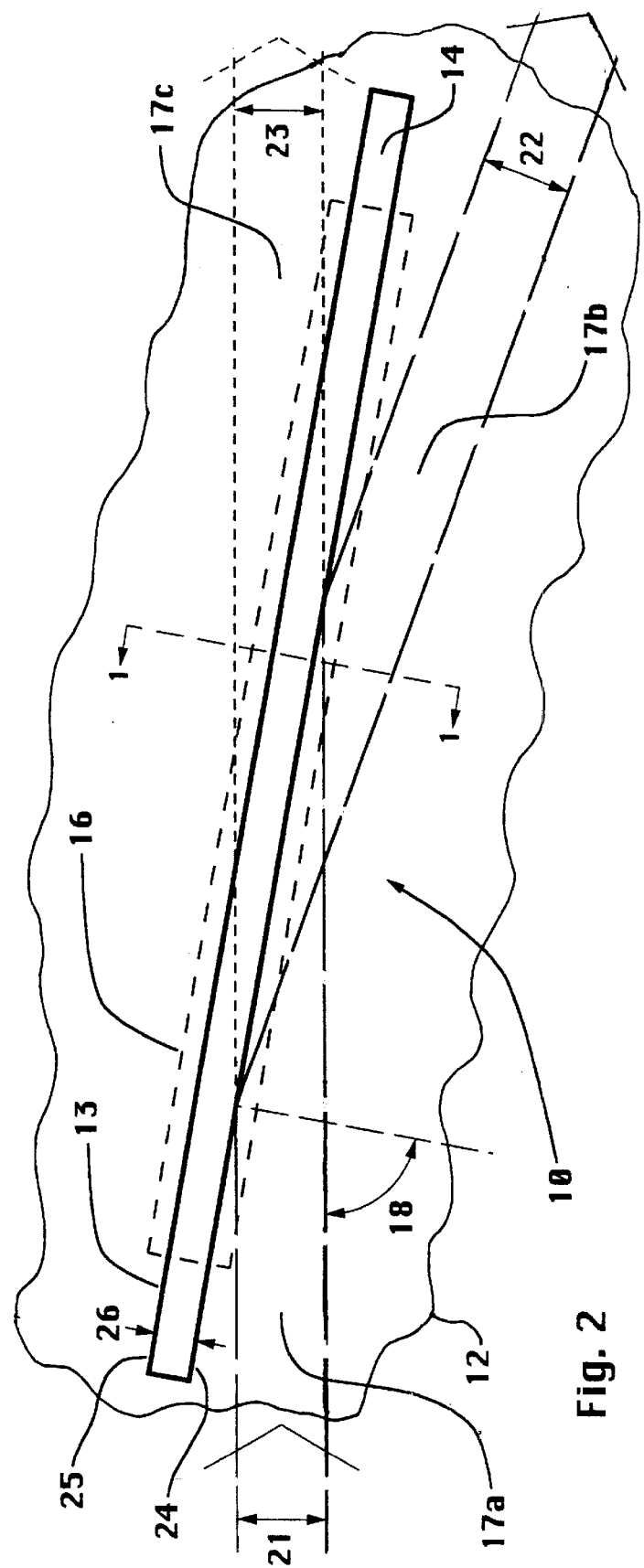
FIG. 2 is a top view illustrating a portion of a device including the planar waveguide integrated optic switch of FIG. 1 showing the liquid crystal filled trench and the paths of the input and reflected beams when the switch is in the ON state, as well as the path that the transmitted beam would take when the switch was in the OFF state.

A cross-sectional view of a portion of a device including liquid crystal based planar waveguide integrated optic switch 10 is shown in FIG. 1. For clarity, a top view of the optic switch 10, across which the sectional view of FIG. 1 is taken along the line 1—1, is shown in FIG. 2. The switch is comprised of a glass substrate 11, a planar waveguide core layer 12, a trench 13 filled with a liquid crystal material 14, a glass superstrate 15, and a temperature control element 16. The nominal thickness and refractive index of the core layer 12 and the nominal refractive indices of both the glass substrate 11 and the glass superstrate 15 are made so that the planar waveguide structure comprised of the core layer 12 and the glass substrate 11 and superstrate 15 supports the propagation of optical beams 17 comprised of at least one guided mode at the operating wavelength of the switch 10. The glass substrate 11 and glass superstrate thus serve as the lower and upper cladding layers for the planar waveguide structure.

For the switch 10 to operate in the ON state, the temperature control element 16 is used to hold the liquid crystal material 14 at a temperature a few degrees below the liquid crystal clearing temperature where the liquid crystal material 14 is well into its nematic phase. When the liquid crystal material 14 is in the nematic phase, the input optical beam 17a encounters a liquid crystal refractive index that is lower than the index of the core layer 12 so that the optical radiation is totally reflected from the liquid crystal filled trench 13 into the output beam 17b.

For the switch 10 to operate in the OFF state, the temperature control element 16 is used to hold the liquid crystal material 14 at a temperature a few degrees above the liquid crystal clearing temperature where the liquid crystal material 14 is well into its isotropic phase. The core layer material 12 is chosen so that at the OFF state operating temperature, the refractive index of the core layer 12 is nominally equal to the isotropic refractive index of the liquid crystal material 14 so that there are no optical reflections at the liquid crystal material 14/core layer 12 interfaces. In the OFF state of the switch, therefore, the input optical beam 17a is transmitted through the liquid crystal filled trench 13 into the alternate output beam 17c.

As indicated above, a top view of the liquid crystal based planar waveguide integrated optic switch 10 is shown in FIG. 2. For clarity it should be pointed out that this view is more accurately a top view of the layer 12 (FIG. 1), the temperature control element 16 being shown in dashed lines. To operate the switch 10, a collimated beam of optical radiation 17a at the operating wavelength of the switch is made to intersect the liquid crystal filled trench 13 at a high angle of incidence 18. There are no structures within the core 12, substrate 11 or superstrate 15 layers (see FIG. 1) to confine the optical beams in the lateral direction. Rather, the collimation of the optical input 17a and output 17b, 17c beams is maintained by making the lateral widths 21, 22, 23 of the optical beams 17 much larger than the optical wavelength of the radiation.

When the liquid crystal material 14 is held at the ON state operating temperature by the temperature control element 16, the liquid crystal material 14 is in the nematic phase and the nematic director within the entire volume of the liquid crystal 14 is made to align with the long dimension of the trench 13 by steric and/or surface alignment forces at the walls of the trench 13. Therefore, at high angles of incidence 18, and at the switch ON state operating temperature, both polarizations of the portions of the input optical beam 17a that penetrate into the trench 13 experience a refractive index that is substantially equal to the liquid crystal material's 14 ordinary refractive index. The liquid crystal material 14 is chosen to possess positive birefringence so that the liquid crystal's ordinary refractive index is lower than the liquid crystal's isotropic refractive index and therefore also lower than the refractive index of the core layer 12. The angle of incidence 18 is made to be above the critical angle associated with the refractive index drop which occurs at the ON state operating temperature between the planar waveguide core 12 and the liquid crystal material 14.

The distance between the front wall 24 and back wall 25 of the trench 13 is made large enough so that substantially no part of the evanescent wave associated with the optical radiation being reflected (see E. Hecht and A. Zajac, *Optics*, Addison-Wesley Publishing-Reading, pp. 81–84 (1974)), from the trench's front wall 24 penetrates through the liquid crystal material 14 to the trench's back wall 25. For this trench width 26, all of the optical radiation in the input beam 17a is reflected from the front wall 24 of the trench 13 to develop an output beam 17b when the liquid crystal material 14 is held at the ON state operating temperature. To drive the switch 10 into the OFF state, the temperature of the liquid crystal material 14 is raised by the temperature control element 16 to the OFF state operating temperature. At the OFF state operating temperature, the refractive indices of the core layer 12 and the liquid crystal material 14 are matched so that the reflectivities at both the front wall 24 and back wall 25 of the trench 13 are nominally zero and so all of the radiation in the input beam 17a is transmitted through the trench 13 to form the alternate output beam 17c. The temperature control element 16 is therefore the only control needed to drive the switch 10 into either the ON or OFF state.

"Although in the forgoing discussion the trench is formed within the core layer only, the trench could also be made to extend above and/or below the core layer as suggested by the dashed lines 13' in FIG. 1."

Although in the foregoing discussion the substrate served the dual purpose of providing the planar waveguide lower cladding layer and providing structural support for all other layers and elements in the switch, a separate substrate material overcoated with one or more waveguide cladding layers could be used to separately provide device structural support and the lower waveguide cladding(s).

Furthermore, in the foregoing discussion the superstrate served the multiple purposes of providing the planar waveguide upper cladding layer, providing a cover for the trench, as well as providing structural support for the temperature control element, a separate superstrate material overcoated with one or more waveguide cladding layers could be used to separately provide the upper waveguide cladding(s), the trench cover and other structural support functions.

Whereas in the foregoing discussion the temperature control element is positioned against the superstrate, it could also be positioned against the substrate. Moreover, in the foregoing discussion the temperature control element is positioned against the superstrate (or substrate as suggested by the dashed lines 43'), one or more temperature control elements could also be embedded within the superstrate and/or substrate.

In the foregoing discussion only one temperature control element was used within the switch; it is also contemplated that two or more temperature control elements could be positioned above and below the trench.

Although in the foregoing discussion only one temperature control element was used to raise and lower the temperature of the liquid crystal filled trench, one or more temperature control elements could be used; some used to hold the switch at either the ON or OFF state operating temperature, and others used to either cool or heat the liquid crystal filled trench to the OFF or ON state operating temperature.

In the foregoing discussion the front and back walls of the trench were depicted as being parallel. Alternatively, the back wall could be angled with respect to the front wall to redirect any residual reflection of radiation from the back wall, when the switch is in the OFF state, along a path different from the ON state output beam path. This redirection of any residual back wall reflected radiation would serve to increase the ON/OFF extinction ratio of the switch.

Although in the forgoing discussion the trench is formed within the core layer only, the trench could also be made to extend above and/or below the core layer as suggested by the dashed lines in FIG. 3.

As an example of the liquid crystal based planar waveguide integrated optic switch 10 shown in FIGS. 1 and 2, the following case is described in which the liquid crystal material 14 is E7 (BDH, Ltd.) and in which the switch is designed to operate over the 1525 to 1575 nm optical wavelength band. The clearing temperature for E7 is 60.5° C. (see S. D. Jacobs, "Liquid Crystals for Laser Applications", in CRC Handbook of Laser Science and Technology, Vol. III, Section 2: Special Properties, CRC Press, p.444 (1986)) so a suitable operating temperature for the switch OFF state is 63° C. where E7 is well into its isotropic phase. A suitable temperature for the switch ON state is 53° C. where E7 is well into its nematic phase.

At the OFF state operating temperature of 63° C and at the mid-band optical wavelength of 1550 nm, the refractive index of E7 is approximately 1.5350. The composition of the glass planar waveguide core layer material 12 is therefore chosen so that the refractive index of the planar waveguide core layer is also 1.5350 under the OFF state operating conditions. In order for the planar waveguide structure comprised of the core layer 12, the substrate 11 and the superstrate 15 to support a single optical mode which is closely matched to the mode of the single-mode optical fiber SMF-28 (Corning Inc.), the thickness of the planar waveguide core layer 12 is made to be approximately 7.0 microns, and the compositions of the glass substrate 11 and superstrate 15 materials are chosen so that the refractive indices of the substrate 11 and superstrate 15 are both approximately 1.5318 at the OFF state operating conditions.

At the ON state operating temperature of 53° C., and at 1550 nm optical wavelength, the ordinary refractive index of E7 is approximately 1.5025. At the ON state operating temperature, the nematic director is aligned with the long dimension of the trench 13. The angle of incidence 18 and trench width 26 are therefore made to be 80 degrees and 10 microns respectively so that under the ON state operating conditions, both polarizations of the incident beam 17a are reflected from the trench's front wall 24, and so that essentially none of the evanescent waves associated with the radiation and reflected reach the trench's back wall 25. An input beam width 21 of 0.2 cm is chosen to ensure that the optical radiation remains nearly collimated throughout the switch. The length of the trench 13 is made to be 1.5 cm so that it extends beyond the edges of the 0.2 cm wide input 17a and output 17b, 17c beams.

As an example of the switch fabrication procedure, the following sequence is summarized: After forming the planar waveguide core layer 12/substrate 11 structure, the trench 13 is etched through nearly the full thickness of the core layer 12. The superstrate 15 is then bonded to the core layer 12 so that it covers all but one end of the trench 13. Next, the enclosed trench 13 is filled with the E7 liquid crystal material 14 through the opening at its end which is then sealed. Finally, a thermoelectric temperature control element 16 is bonded to the top of the superstrate 15 to complete the basic switch structure 10.

To operate the E7 based switch in the ON state, the temperature of the liquid crystal material 14 is maintained at a temperature of 53° C. by the temperature control element 16. At this temperature, substantially all incident radiation in the input beam 17a within the 1525 to 1575 nm optical wavelength band is reflected into the output beam 17b. To operate the switch in the OFF state, the temperature of the liquid crystal material 14 is maintained at a temperature of 63° C. by the temperature control element 16. At this temperature, substantially all incident radiation in the input beam 17a within the 1525 to 1575 nm optical wavelength band is transmitted through the E7 filled trench 13 into the alternate output beam 17c.

Figure 3:
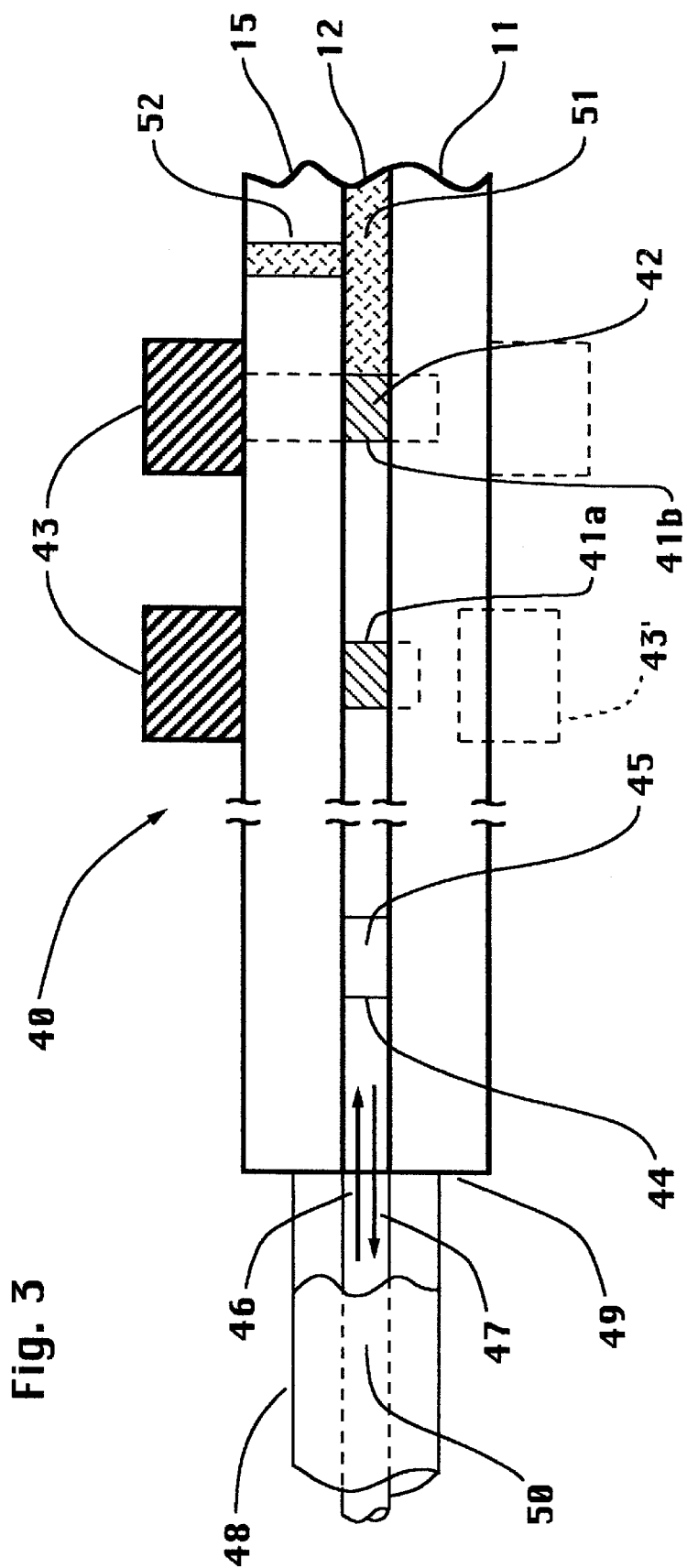
FIG. 3 is a cross-sectional view of an optical cross-connect based on the planar waveguide integrated optic switches showing an input optical fiber, the cross-connect waveguide layers, a collimator mirror, two of the switch elements, a fill channel, and a through hole in the superstrate.

A side view of a portion of an optical cross-connect 40 based on the liquid crystal planar waveguide integrated optic switches of the present invention is shown in FIG. 3. The cross-connect is comprised of a glass substrate 11, a planar waveguide core layer 12, a glass superstrate 15, an array of trenches 41a, 41b filled with a liquid crystal material 42, and arrays of temperature control elements 43 and beam collimator mirror elements 44. Each collimator mirror element 44 is left unfilled so that an air pocket 45 (see also FIG. 4) is formed within the core layer 12. Optical inputs 46 to and outputs 47 from the cross-connect 40 are made via single- or multi-mode optical fibers 48. The fibers 48 are bonded to the edge(s) 49 of the cross-connect 40 with the core 50 of each fiber 48 aligned with the planar waveguide core layer 12. The thickness of the core layer 12 and the refractive indices of the substrate 11 and superstrate 15 are again chosen to maximize the optical coupling between the optical fibers 48 and the planar waveguide structure comprised of the core layer 12, the substrate 11 and the superstrate 15. Groups of trenches 41b are interconnected by fill channels 51 to facilitate filling of each trench group 41b with the liquid crystal material 42 via through holes 52 in the superstrate 15.

Figure 4:
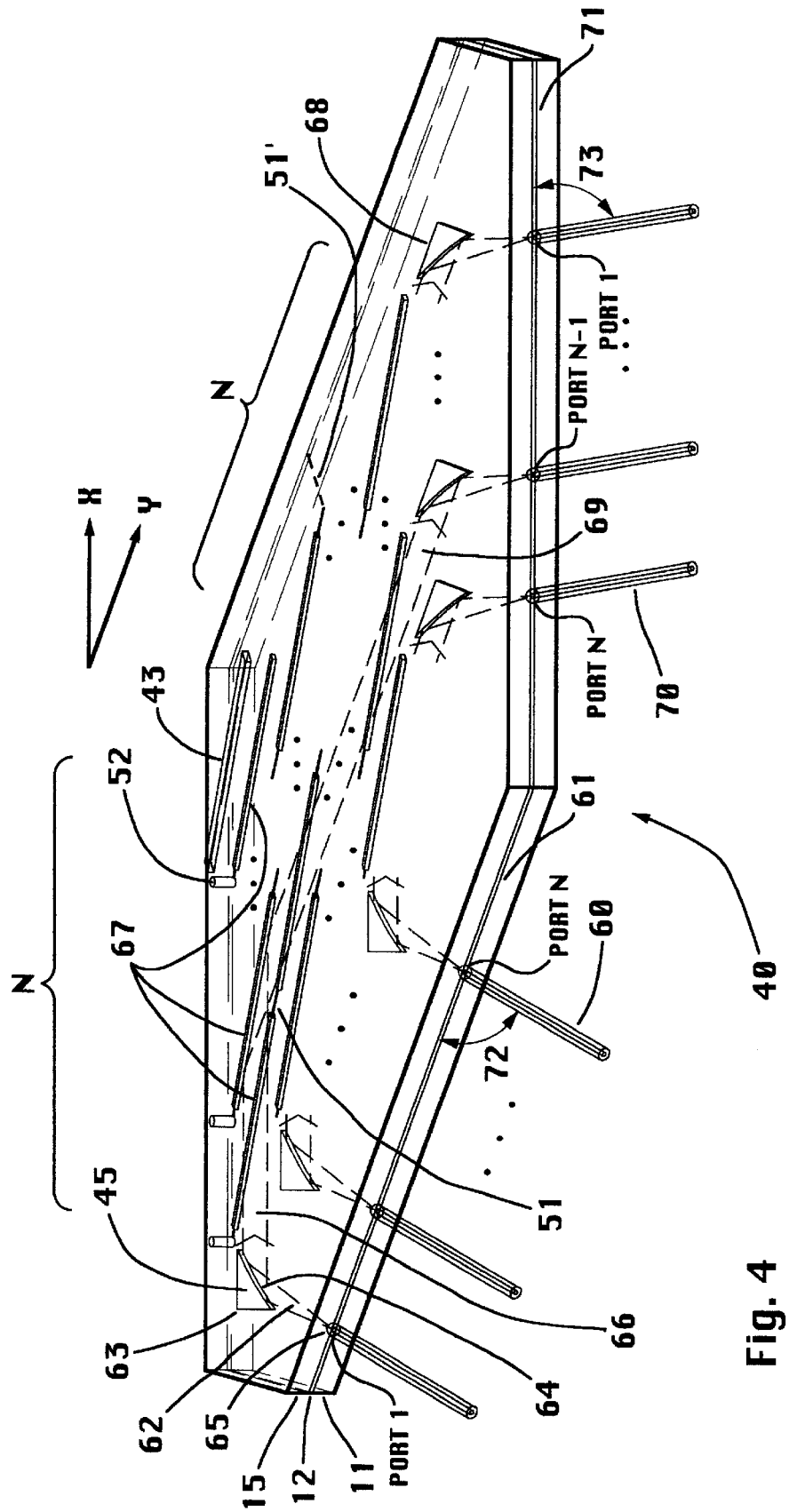
FIG. 4 is a perspective view of an optical cross-connect based on the planar waveguide integrated optic switches showing the optical fiber inputs and outputs, the collimator arrays, the switch array, and the path of a beam being directed from input port 1 to output port N-1.

A perspective view of the optical cross-connect 40 is shown in FIG. 4. For clarity, only one temperature control element 43 is shown. A linear array of input optical fibers 60 is bonded to the input edge 61 of the cross-connect. The optical radiation 62 from each input fiber 60 is allowed to spread out laterally within the planar waveguide structure, comprised of the substrate 11, the core layer 12, and the superstrate 15, until it reaches the corresponding input collimator mirror element 63. Each collimator mirror element 63 is comprised of an air or other gas filled pocket 45 in the planar waveguide core layer 12 (see also FIG. 3) with one side wall of the pocket 64 being an off-axis parabolic surface.

The focal point 65 of each off-axis parabolic surface 64 is made to lie on the input face 61 of the cross-connect 40. Each input fiber 60 is bonded to the input edge 61 at the location of the focal point 65 of a corresponding input collimator mirror element 63. At all points along the off-axis parabolic surface 64, the angle of incidence of the input radiation 62 is made to be greater than the critical angle for the planar waveguide core 12/air pocket 45 interface so that substantially all of the input radiation 62 is reflected into a beam 66 which is collimated in the lateral direction. The linear array of point source optical inputs from the optical fibers 60 is therefore transformed into N collimated beam inputs to the N×N array of switch elements 67. A linear array of output collimator mirror elements 68 is used to refocus the still collimated beam outputs 69 from the switch array 67 onto the linear array of output optical fibers 70. The output fibers 70 are bonded to the output edge 71 of the cross-connect 40 at locations corresponding to the focal points of the output collimator mirror elements 68.

As shown in FIG. 4, groups of switch elements 67 are interconnected by fill channels 51. Each interconnected group of switch elements 67 and fill channels 51 is connected to a through hole 52 in the superstrate 15 for the purpose of filling the switch elements 67 with the liquid crystal material 42 (see FIG. 3). Also as shown in FIG. 4, the input and output fibers 60 and 70 are bonded to the input and output edges 61 and 71 at angles 72 and 73 which are less than 90 degrees to minimize the back reflections from these bonds into the input fibers 60 or into the cross-connect 40.

The cross-connect 40 shown in FIGS. 3 and 4 is operated by holding one switch in each row of the switch array 67 in the ON state to direct the corresponding input beam into the desired output beam path. To avoid optical blockage of any of the collimated beams 66 within the cross-connect 40, only one switch in each column of the switch array 67 is held in the ON state and the remaining switches in each column are held in the OFF state. Since the refractive indices of the core layer 12 and the liquid crystal material 42 are matched at the OFF state operating temperature, radiation incident on a switch element 67 in the OFF state from either side of the trench 41 will be transmitted through the switch element 67. In FIG. 4, the input beam 66, from input port 1, is shown being directed to output port N-1. During normal operation, therefore, a total of N switches in the N×N array of switch elements 67 are held in the ON state in an optically non-blocking way and the remaining switches are held in the OFF state.

Figure 5:
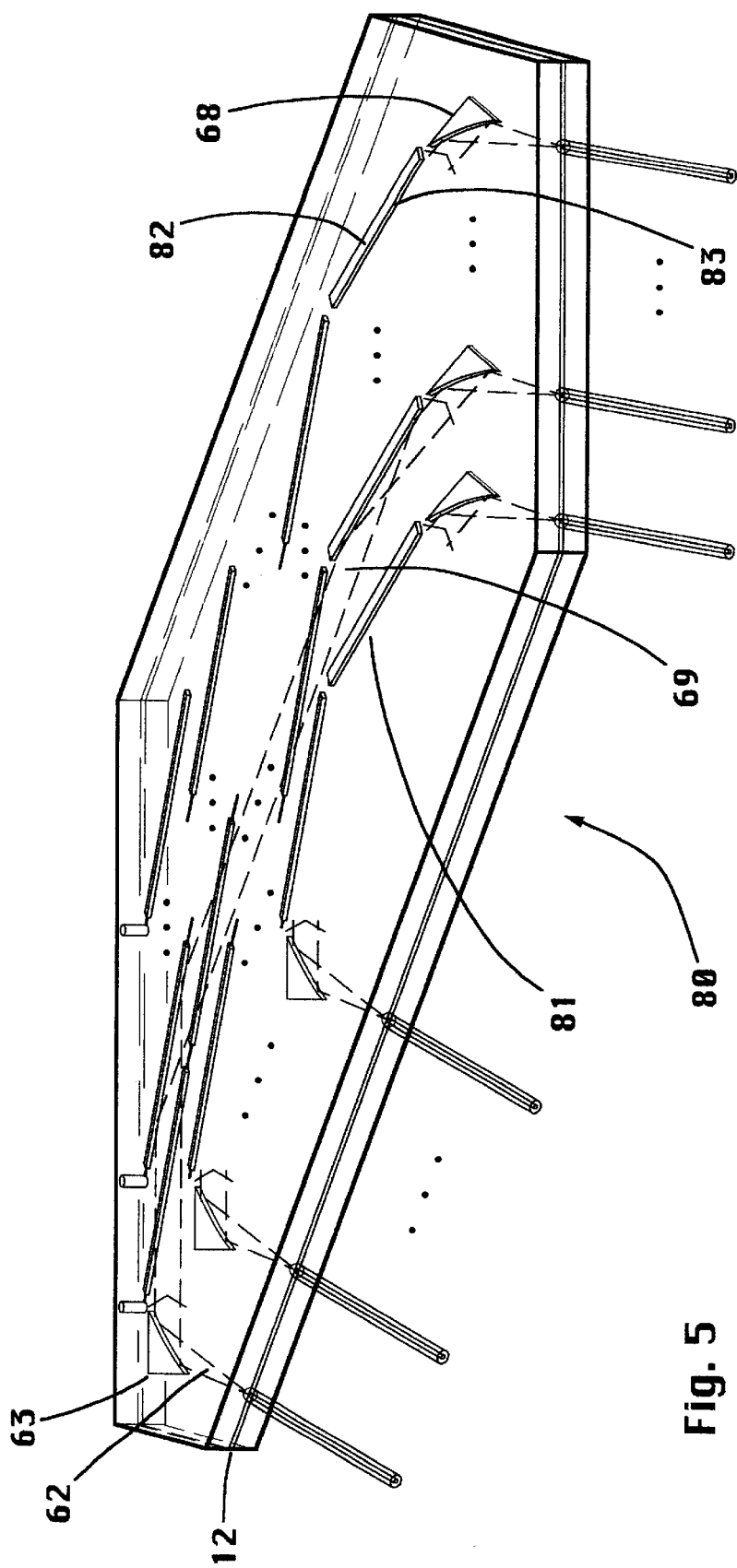
FIG. 5 is a perspective view of an alternate optical cross-connect layout showing the optical fiber inputs and outputs, the collimator arrays, the switch array, an output mirror array, and the path of a beam being directed from input port 1 to output port N-1.

An alternate cross-connect geometry 80 is shown in FIG. 5. In addition to the elements that comprise the cross-connect 40 shown in FIGS. 3 and 4, the alternate cross-connect geometry 80 of FIG. 5 contains an array of planar mirror elements 81 which serve to restore the symmetry of the input optical radiation 62 when the collimated beam outputs 69 are refocussed by the output collimator array 68. The planar mirror elements 81 are formed by the same process used to form the collimator mirror arrays 63 and 68 and so contain air pockets 82. At all points along the front surface 83 of each planar mirror element 81, the angle of incidence of the collimated output beam radiation 69 is made to be greater than the critical angle for the planar waveguide core 12/air pocket 82 interface so that substantially all of the output radiation 69 is reflected from the front surface 83 of the planar mirror element 81.

Figure 6:
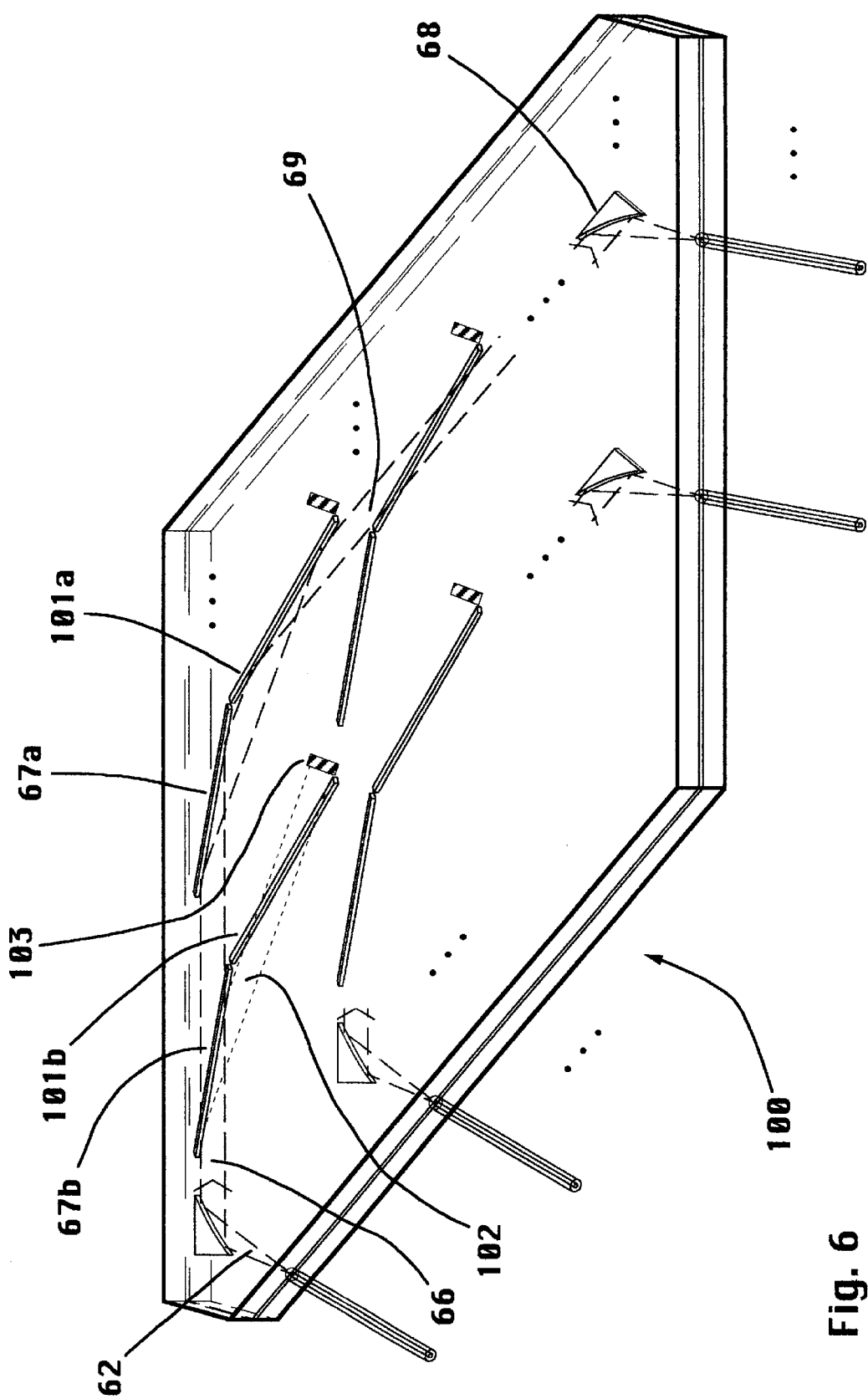
FIG. 6 is a perspective view of another alternate optical cross-connect layout showing the optical fiber inputs and outputs, the collimator arrays, an array of switch pairs with optional absorber elements, and the path of a beam being directed from input port 1 to output port N-1.

Another alternate cross-connect geometry 100 is shown in FIG. 6. In addition to the elements that comprise the cross-connect 40 shown in FIGS. 3 and 4, the alternate cross-connect geometry 100 of FIG. 6 contains a second switch element (such as shown at 101a and 101b) at each node of the cross-connect 100. The second switch element serves to both restore the symmetry of the input optical radiation 62 when the collimated beam outputs 69 are refocused by the output collimator array 68 and also to reduce the cross-talk from switch elements (67a, 67b) in the OFF state. In operation, both switch elements in a pair are either in the ON state or in the OFF state. For example, when both switch elements 67a and 101a are in the ON state, the input beam 66 is directed into the direction illustrated by the output beam 69. When both switch elements 67b and 101b are in the OFF state any residual optical radiation 102 reflected from the first switch element 67b is almost entirely transmitted through the second switch element 101b and so is not directed toward the output collimator array 68. Optional optical absorber elements 103 can be placed behind the second switch elements 101 to remove the residual optical radiation 102 from the cross-connect 100.

Figure 7:
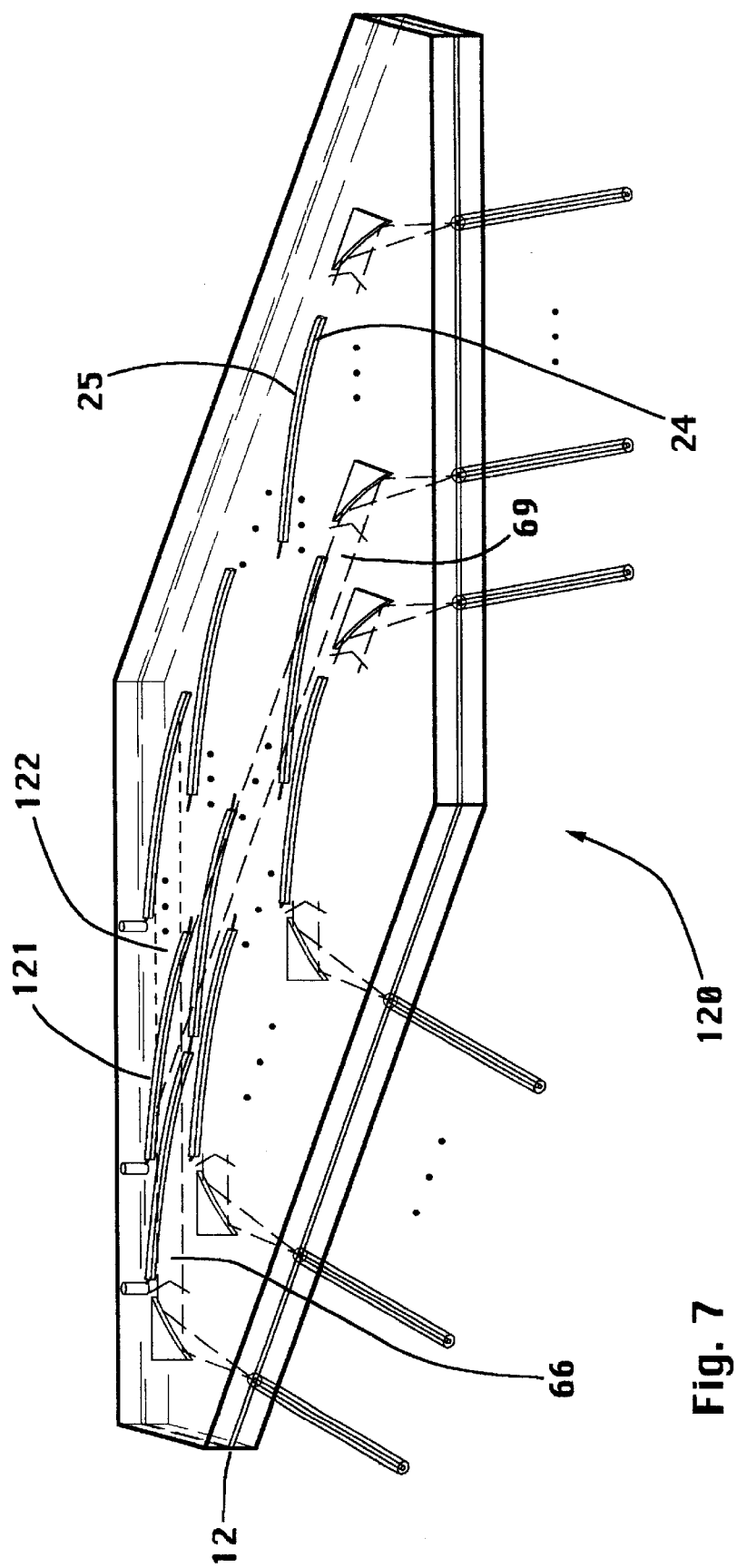
FIG. 7 is a perspective view of still another alternate optical cross-connect layout showing the optical fiber inputs and outputs, the collimator arrays, an array of curved switch elements, and the path of a beam being directed from input port 1 to output port N-1.

Still another alternate cross-connect geometry 120 is shown in FIG. 7. The alternate cross-connect geometry 120 of FIG. 7 is similar to the cross-connect 40 shown in FIGS. 3 and 4 with the exception that the front wall 24 (see also FIG. 2) of each switch element 121 of the alternate cross-connect 120 is curved. The amount and shape of the curvature of the front wall 24 of each switch element 121 is such that any lateral diffraction and/or spreading of the optical input 66 and output 69 beams is largely compensated for by reflection from the curved front wall 24 when the switch element 121 is in the ON state. Since each switch element 121 is associated with a unique combination of one input beam 66 and one output beam 69, the front wall 24 of each switch element 121 can have a unique curvature to specifically compensate for the lateral diffraction and/or spreading associated with a given pair of input 66 and output 69 beams. The back wall 25 (see also FIG. 2) of each switch element 121 of the alternate cross-connect 120 may also be uniquely curved. The amount and shape of the curvature of each back wall 25 of each switch element 121 is such as to ensure that the transmitted beam 122 from each switch element 121 is free from distortion when the switch element 121 is in the OFF state even when the index of the liquid crystal material 42 does not exactly match the refractive index of the core layer 12.

Although in the foregoing discussion the filling of the interconnected trench groups was accomplished via through holes formed in the upper cladding and superstrate materials, the filling of the interconnected trench groups could also be accomplished via channels that extend to the edge of the cross-connect.

Furthermore, although in the foregoing discussion only one temperature control element was used to raise and lower the temperature of an individual liquid crystal filled trench, more than one temperature control elements could be used; some used to hold the switch array at either the ON or OFF state operating temperature and others used to either heat or cool the appropriate liquid crystal filled trenches to the OFF or ON state operating temperature.

In the foregoing discussion the temperature control elements were depicted as individual elements. However, it is alternatively contemplated that temperature control elements could be integrated into single structures which could be bonded to the superstrate and/or substrate, or even be integrated into the superstrate and/or substrate.

As an example of the optical cross-connect 40 shown in FIGS. 3 and 4, the following case is described in which the switch array 67 is comprised of the liquid crystal planar waveguide integrated optic switches described above, which the liquid crystal material 42 is E7 (BDH, Ltd.), and in which the cross-connect is designed to operate over the 1525 to 1575 nm optical wavelength band. The input and output single-mode optical fibers 60 and 70 (SMF-28, Corning, Inc.) are bonded to the input and output faces 61 and 71 at angles 72 and 73 of 80 degrees. The focal lengths of the input and output collimator mirrors 63 and 68 are 0.76 cm so that the widths of the collimated beam inputs 66 and outputs 69 are approximately 0.2 cm. At all points along the off-axis parabolic surfaces 64 of the mirrors 63, the angle of incidence of the input radiation 62 is made to be greater than 48 degrees so that substantially all of the input radiation 62 is reflected into a beam 66 which is collimated in the lateral direction. The same incident angle conditions are made to hold at the output collimator mirrors 68 so that substantially all of the radiation in each collimated beam output 69 is refocused onto the output edge 71 of the cross-connect 40. Within the cross-connect, the E7 based switch elements 67 are spaced at approximately 1.0 cm in the X direction and 0.37 cm in the Y direction.

As an example of the cross-connect fabrication procedure, the following sequence is summarized: After forming the planar waveguide core layer 12/substrate 11 structure, the trench and collimator mirror elements 41, 63 and 68 are etched through nearly the full thickness of the core layer 12. The superstrate 15 is then bonded to the core layer 12 so that it covers the entire cross-connect and so that the through holes 52 in the superstrate 15 are aligned with the corresponding interconnected trench groups 41b. The input and output edges 61 and 71 of the cross-connect 40 are then prepared so that they lie along the line of focal points of the input and output collimator mirror arrays 63 and 68 and so that their surfaces are suitable for opto-mechanical bonding of the arrays of input and output fibers 60 and 70. Next, the enclosed trenches 41 are filled with the E7 liquid crystal material 42 through the through holes 52 which are then sealed. Thermoelectric temperature control elements 43 are then bonded to the top of the superstrate 15 over the filled trenches. Finally, the arrays of input and output fibers 60 and 70 are opto-mechanically bonded to the input and output edges 61 and 71 of the cross-connect 40 at the appropriate locations to complete the basic cross-connect device.

To operate the E7 based example of the optical cross-connect 40 shown in FIGS. 3 and 4, one switch element in each row of the array 67 is held at the ON state operating temperature of 53° C. by the associated temperature control element 43 to direct the corresponding input beam into the desired output beam path. All other switch elements are held at the OFF state operating temperature of 63° C. by their associated temperature control elements. For the case in which the cross-connect was an 8×8, FIG. 4 depicts the number 1 input beam 66 being directed to output port 7. During normal operation therefore, a total of 8 switches are held at the ON state operating temperature in an optically non-blocking way while the remaining 56 switches are held at the OFF state operating temperature.

An alternate embodiment of the planar waveguide integrated optical switch in which the switch is configured to operate as a digitally addressed variable attenuator 140 is shown in FIG. 9. This alternate switch is similar to the planar waveguide switch shown in FIGS. 1 and 2 with the exception that instead of controlling the temperature of the liquid crystal filled trench 13 with a single temperature control element 16 (see FIG. 2), a plurality of temperature control elements 141 are employed to drive individual sections of the liquid crystal filled trench 13 into either the ON state or the OFF state. When all sections of the trench 13 are held in the ON state, the entire input beam 17a is reflected from the trench's front wall 24 into the output beam 17b with substantially no attenuation. When some sections of the trench 13 are driven into the OFF state, and other sections are held in the On state, the portions of the input beam 17a which impinge on the OFF sections of the trench 13 are transmitted through those sections of the trench 13 into the alternate output beam 17c. The output beam 17b therefore serves as the attenuated beam and the alternate output beam 17c serves as the compliment attenuated beam. By choosing the size and position of the individual temperature control elements 141 along the trench 13, and in relation to the input beam 17a, the amount of attenuation produced by a given temperature control element can be given a desired weighting; such as binary for example (in other words ½, or ¼, or ⅛, etc.), relative to the total attenuation provided by the attenuator 140.

Similar structure, assembly method and materials could also be used to implement the alternative embodiments disclosed in other figures of the drawings as well as other layouts, configurations and combinations that will become apparent to those skilled in the art.

As described above, this invention provides a liquid crystal based integrated optic switch that is capable of efficiently redirecting optical beams of arbitrary polarization state in a planar waveguide geometry. This invention further provides an optical cross-connect architecture based on these liquid crystal integrated optic planar waveguide switches which is capable of interfacing with and interconnecting a large number of single- or multi-mode optical fiber input and output channels. The optical fiber to cross-connect interfacing is accomplished with stable opto-mechanical bonds but without the use of channel waveguides within the cross-connect. This invention still further provides a configuration for the liquid crystal integrated optic planar waveguide switch which allows the switch to be operated as a variable attenuator. Moreover, this type of switch and the associated cross-connect and variable attenuator are suitable for routing and attenuating optical signals carried by single-mode optical fibers over wavelength ranges of interest to the telecommunications industry. Moreover, this type of switch is also suitable for integration with other silica-on-silicon devices to provide routing, shuttering or attenuation functionality.

While the present invention has been described in terms of some specific examples and and has been illustrated in some specific embodiments, it will be clear that this invention is not limited to these specific examples and embodiments, and that many alterations and modified embodiments will be apparent to those skilled in the art without departing from the true spirit and scope of the invention. It is therefore intended that the appended claims be construed broadly to cover all embodiments that fall within the true spirit and scope of the invention.

What is claimed is:

1. An integrated optic switch capable of redirecting optical beams in a planar waveguide geometry comprising:
   an optical planar waveguide structure including
      a lower cladding layer,
      a core layer having means for introducing an incident optical beam therein to,
      a trench formed in said core layer,
      an upper cladding layer, and
      a temperature control element;
      said trench extending at least substantially through the thickness of said core layer, said trench being filled with a liquid crystal material, said liquid crystal, and said core layer having refractive indices that are at least substantially matched at a temperature at which said liquid crystal material is in its isotropic phase, said liquid crystal filled trench being covered by said upper cladding layer, said temperature control element disposed at a location above said liquid crystal filled trench, said liquid crystal having its director aligned along the long dimension of said trench when said liquid crystal is in its nematic phase, said liquid crystal material having positive birefringence so that the ordinary refractive index of said liquid crystal material in said nematic phase is lower than said isotropic refractive index as well as said core layer refractive index, the angle of incidence of an incident optical beam passing through said core layer and onto said liquid crystal filled trench being larger than that needed for total reflection of said optical beam from the interface between said core layer and said liquid crystal material when said liquid crystal material is in said nematic phase, said temperature control element having the capability of holding said liquid crystal filled trench at said temperature at which said liquid crystal material is in said nematic phase so that said optical beam is redirected by reflection from said interface so that said optic switch is in its ON state, said temperature control element alternatively having the capability of holding said liquid crystal filled trench at said temperature at which said liquid crystal material is in said isotropic phase so that said optical beam is transmitted through said liquid crystal filled trench so that said optic switch is in its OFF state.

2. An integrated optic planar waveguide switch as recited in claim 1 wherein said core layer has a predetermined thickness, and said lower and upper cladding layers have refractive indices such that said optical planar waveguide structure supports, in the direction normal to said planar waveguide layers, the propagation of a single optical mode which can be coupled efficiently to the optical mode supported in a single-mode optical fiber.

3. An integrated optic planar waveguide switch as recited in claim 1 wherein said core layer has a predetermined thickness, and said lower and upper cladding layers have refractive indices such that said optical planar waveguide structure supports, in the direction normal to said planar waveguide layers, the propagation of more than a single optical mode which can be coupled efficiently to the optical modes supported in a multi-mode optical fiber.

4. An integrated optic planar waveguide switch as recited in claim 1 wherein said trench is cut into both said core layer and at least one of said lower cladding layer and said lower cladding layer.

5. An integrated optic planar waveguide switch as recited in claim 1 wherein said trench has a front wall and a back wall and wherein the back wall of said trench is tilted at a small angle with respect to the front wall of said trench so that in said switch OFF state any reflection from said trench back wall of said transmitted optical beam is directed away from the normal path of said reflected beam in said switch ON state for the purpose of reducing the cross-talk of said switch when in said OFF state.

6. An integrated optic planar waveguide switch as recited in claim 1 wherein the geometry of a portion of said liquid crystal filled trench is modified to direct or transmit a portion of said incident optical beam into a separate optical beam path so as to create an optical tap within said switch.

7. An integrated optic planar waveguide switch as recited in claim 1 wherein said temperature control element is affixed to said lower cladding layer at a location below said liquid crystal filled trench.

8. An integrated optic planar waveguide switch as recited in claim 1 wherein more than one temperature control element is used to raise and lower said temperature of said liquid crystal filled trench.

9. An integrated optic planar waveguide switch as recited in claim 1 wherein one or more surfaces of said liquid crystal filled trench are provided with alignment coatings to assist in alignment of said liquid crystal director with said long dimension of said trench when driving said switch into said ON state.

10. An integrated optic planar waveguide switch as recited in claim 1 wherein an electric field is applied to said trench either continuously or when driving said switch into said ON state to assist in said liquid crystal director alignment with said long dimension of said trench.

11. An integrated optic planar waveguide switch as recited in claim 1 wherein a magnetic field is applied to said trench either continuously or when driving said switch into said ON state to assist in alignment of said liquid crystal director with said long dimension of said trench.

12. An integrated optic planar waveguide switch as recited in claim 1 wherein the refractive index of said core layer in the regions within the paths of said optical beams is made to be slightly higher than said refractive index in adjacent regions of said core layer in order to reduce the leakage of optical radiation from the edges of said optical beams.

13. An integrated optic switch capable of redirecting an optical beam in a planar waveguide geometry comprising
   a substrate,
   a core layer,
   a trench formed in said core layer and including front and back walls,
   a superstrate, and
   a temperature control element, said trench extending through the thickness of said core layer, said trench being filled with a liquid crystal material, said liquid crystal material and said core layer having refractive indices of approximately 1.5350 at an optical wavelength of 1550 nm and at a temperature of 63° C., said core layer having a thickness of 7.0 microns, and said substrate and superstrate having refractive indices of approximately 1.5318, said liquid crystal filled trench being covered by said superstrate, said temperature control element being bonded to said superstrate at a location above said liquid crystal filled trench, said liquid crystal filled trench having a length of 1.5 cm, said optic switch further including means for causing the angle of incidence of said optical beam on said liquid crystal filled trench to be substantially 80 degrees, the distance between the front and back walls of said liquid crystal filled trench being 10 microns, said temperature control element being of the thermoelectric type, and having the capability of holding said liquid crystal filled trench at a temperature of 53° C. wherein said liquid crystal material is in its nematic phase with its director aligned with the long dimension of said trench causing said optic switch to be in its ON state, whereby said optical beam is redirected by total reflection from said liquid crystal filled trench, said temperature control element also having the capability of alternatively holding said liquid crystal filled trench at a temperature of 63° C. wherein said liquid crystal material is in its isotropic phase causing said optic switch is in its OFF state optical beam is transmitted through said liquid crystal filled trench.

14. An integrated optic planar waveguide switch as recited in claim 13 wherein said trench is alternatively filled with a ferroelectric liquid crystal.

15. An integrated optic planar waveguide switch as recited in claim 13 wherein the temperature of said liquid crystal filled trench is alternatively controlled by a temperature control element selected from the group consisting of an electric resistive type heater element, an electric radio frequency type heater element, and an optical radiation type heater element.

16. An integrated optic planar waveguide switch as recited in claim 13 wherein said temperature control includes one or more thermoelectric heater/coolers positioned against said substrate or said superstrate, and one or more electric heater elements positioned against either said substrate or said superstrate on the side opposite said thermoelectric heater/cooler elements.

17. An integrated optic planar waveguide switch as recited in claim 13 wherein anodic bonding is used to bond said superstrate to said core layer.

18. An integrated optic planar waveguide switch as recited in claim 13 wherein separate upper and/or lower optical cladding layers are positioned against said core layer to optically isolate said core layer from said superstrate and/or said substrate.

19. An integrated optic planar waveguide switch as recited in claim 18 wherein said substrate or said superstrate is made from a material other than glass.

20. An integrated optic planar waveguide switch as recited in claim 18 wherein said upper cladding layer is deposited directly on said temperature control element and then bonded to said core layer.

21. An integrated optic planar waveguide switch as recited in any of claims 13–20 wherein at least one of said planar waveguide layers is formed using flame hydrolysis deposition techniques.

22. An integrated optic planar waveguide switch as recited in any of claims 13–20 wherein at least one of said planar waveguide layers is made from an optically transparent semiconductor material.

23. An integrated optic planar waveguide switch as recited in any of claims 13–20 wherein at least one of said planar waveguide layers is made from glass.

24. An optical cross-connect capable of dynamically interconnecting a large number of optical fiber input and output channels comprising:
   an integrated array of independently addressable optic planar waveguide switch elements as recited in any of claims 1–20, said array of output beam collimator mirrors being aligned with said switch array so that an array of substantially point source optical inputs is transformed into an array of collimated optical beams, and
   an array of integrated output beam refocusing mirrors, said array of output beam refocusing mirrors being aligned with said switch element array so that said array of collimated optical beams is transformed into a corresponding array of substantially point source optical outputs, one edge of said cross connect being adapted to receive the array of point source optical inputs, another edge of the cross connect being adapted to output the array of point source optical outputs, one switch element in each tow of said switch element array being held in its ON state to direct a corresponding input beam to a corresponding optical output, all other switch elements in said switch element array being held in their OFF state.

25. An optical cross-connect as recited in claim 24 and further comprising an additional array of output mirror elements which serve to restore the symmetry of the point source optical inputs when the collimated optical beams are refocused into said corresponding array of point source optical outputs.

26. An optical cross-connect as recited in claim 24 wherein the temperature control elements are integrated into a single structure which is associated with at least on eof said upper cladding layer and said lower cladding layer.

27. An optical cross-connect as recited in claim 24 wherein groups of the switch elements are interconnected to each other and to through holes in the upper cladding layer by channels within the core layer for the purpose of filling the trenches with the liquid crystal material.

28. An optical cross-connect as recited in claim 24 wherein a second switch element is employed at each node within the cross-connect which serves to both reduce crosstalk and to restore the symmetry of said point source optical inputs when said collimated optical output beams from said switch element are refocused into said corresponding array of said substantially point source optical outputs.

29. An optical cross-connect as recited in claim 24 wherein optical absorber elements are positioned within the cross-connect to remove residual or stray optical radiation.

30. An optical cross-connect as recited in claim 24 wherein each switch element is sufficiently curved so that any lateral diffraction and/or spreading of the optical input and output beams is compensated for by reflection from the curved front wall of the switch element when the switch element is in the ON state.

31. A 2×2 optical cross-connect building block capable of dynamically switching two input beams into two output beams in either a cross state or a bar state comprising:

four independently addressable integrated optic planar waveguide switch elements as recited in any of claims 1–20, said switch elements being oriented so that when all of said switch elements are held in the ON state, said input beams are directed by reflection from said switch elements into said output beams and said building block is in said cross state, and when all of said switch elements are held in said OFF state, said input beams are transmitted through said switch elements into said output beams and said building block is in said bar state.

32. An optical cross-connect as recited of claim 24 wherein each said switch element has a curved front wall sufficiently curved so that any lateral diffraction and/or spreading of said optical input and output beams is largely compensated for by reflection from the curved front wall of the switch elements when the switch elements are in said ON state.

33. An integrated optic planar waveguide switch as recited in claim 1–20 in which said switch is configured for operation as a variable attenuator by employing a plurality of individually addressable temperature controlled elements respectively positioned in sequence along said liquid crystal filled trench, said individually addressable temperature controlled elements being operable to control both a corresponding fraction of the incident optical beam that is reflected from said liquid crystal filled trench into said output or attenuated beam, and the fraction of said incident optical beam that is transmitted through said liquid crystal filled trench into said alternate output or compliment attenuated beam.

34. An optical cross-connect as recited in claim 24 wherein at least one switch element is configured for operation as a variable attenuator, said variable attenuator employing a plurality of individually addressable temperature controlled elements respectively positioned in sequence along a corresponding liquid crystal filled trench, said individually addressable temperature controlled elements being operable to control both a corresponding fraction of the incident optical beam that is reflected from said liquid crystal filled trench into said output or attenuated beam, and the fraction of said incident optical beam that is transmitted through said liquid crystal filled trench into said alternate output or compliment attenuated beam.

* * * * *